United States Patent
Bhamidipati

(10) Patent No.: US 11,042,974 B2
(45) Date of Patent: Jun. 22, 2021

(54) METHOD AND SYSTEM FOR DETERMINING A DEGREE OF CORRELATION BETWEEN A SIMULATED CAMERA IMAGE AND AN ACTUAL CAMERA IMAGE

(71) Applicant: Robert Bosch GmbH, Stuttgart (DE)

(72) Inventor: Phanikumar Bhamidipati, Novi, MI (US)

(73) Assignee: Robert Bosch GmbH, Stuttgart (DE)

( * ) Notice: Subject to any disclaimer, the term of this patent is extended or adjusted under 35 U.S.C. 154(b) by 163 days.

(21) Appl. No.: 16/238,908

(22) Filed: Jan. 3, 2019

(65) Prior Publication Data

US 2019/0213730 A1 Jul. 11, 2019

Related U.S. Application Data

(60) Provisional application No. 62/615,141, filed on Jan. 9, 2018.

(51) Int. Cl.
*G06K 9/34* (2006.01)
*G06T 7/00* (2017.01)
(Continued)

(52) U.S. Cl.
CPC ........ *G06T 7/0002* (2013.01); *G06K 9/00791* (2013.01); *G06K 9/4647* (2013.01);
(Continued)

(58) Field of Classification Search
CPC ....... G06K 2009/6213; G06K 9/00791; G06K 9/4647; G06K 9/6215; G06T 2207/20021;
(Continued)

(56) References Cited

U.S. PATENT DOCUMENTS 8,907,950 B2 12/2014 Miyata et al.
2010/0136507 A1* 6/2010 Miyata ..................... G09B 9/04
434/29

(Continued)

OTHER PUBLICATIONS

CFR, Title 49, Subtitle B, Chapter V, Part 571, Subpart B, Section 571.111.

(Continued)

*Primary Examiner* — Xin Jia
(74) *Attorney, Agent, or Firm* — Kelly McGlashen; Maginot, Moore & Beck LLP

(57) ABSTRACT

A method of determining a correlation between a simulated camera image and an actual camera image includes obtaining, from a camera field of view simulator, a simulated camera image of a scene, where the scene includes a view area and a reference pattern that is overlaid on the view area. The reference pattern segregates the view area into at least one region, and each region is further segregated into sections that together define a uniform orthogonal grid. The method also includes obtaining, from a camera, an actual camera image of the scene, analyzing the images to determine differences in image intensity between regions of the simulated camera image and the corresponding regions of the actual camera image; and determining a degree of correlation between the simulated camera image and the actual camera image based on the differences in image intensity.

12 Claims, 6 Drawing Sheets

(51) Int. Cl.
   *G06K 9/62* (2006.01)
   *G06K 9/46* (2006.01)
   *G06T 7/11* (2017.01)
   *G06K 9/00* (2006.01)

(52) U.S. Cl.
   CPC .............. *G06K 9/6215* (2013.01); *G06T 7/11* (2017.01); *G06K 2009/6213* (2013.01); *G06T 2207/20021* (2013.01); *G06T 2207/30168* (2013.01); *G06T 2207/30252* (2013.01)

(58) Field of Classification Search
   CPC . G06T 2207/30168; G06T 2207/30252; G06T 7/0002; G06T 7/001; G06T 7/11
   See application file for complete search history.

(56) References Cited

U.S. PATENT DOCUMENTS

| | | | | |
|---|---|---|---|---|
| 2011/0216201 | A1* | 9/2011 | McAndrew | G06T 7/80 348/148 |
| 2014/0111637 | A1* | 4/2014 | Zhang | B60R 1/00 348/118 |
| 2018/0101178 | A1* | 4/2018 | Yoon | G06K 9/00791 |
| 2020/0184617 | A1* | 6/2020 | Perron | G01B 15/00 |

OTHER PUBLICATIONS

Mazzae et al, "Vehicle Rearview Image Field of View and Quality Measurement", National Highway Traffic Safety Administration, Vehicle Research and Test Center, Sep. 2011, Report No. DOT HS 811 512.

\* cited by examiner

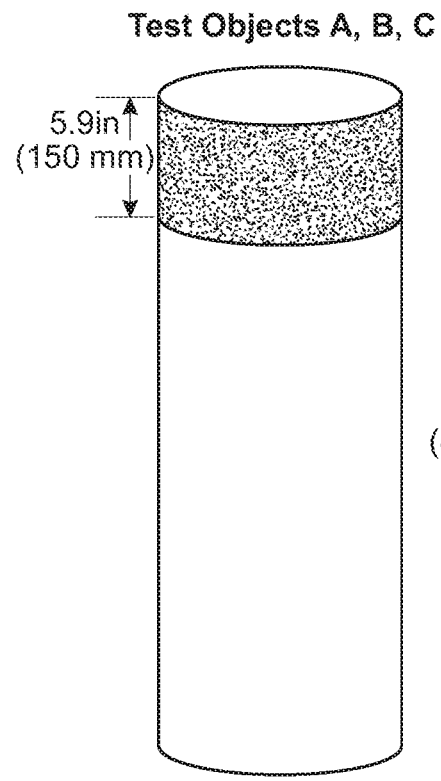
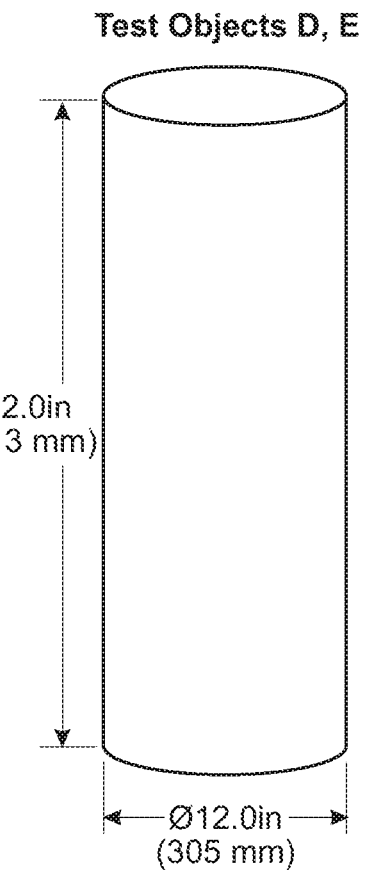
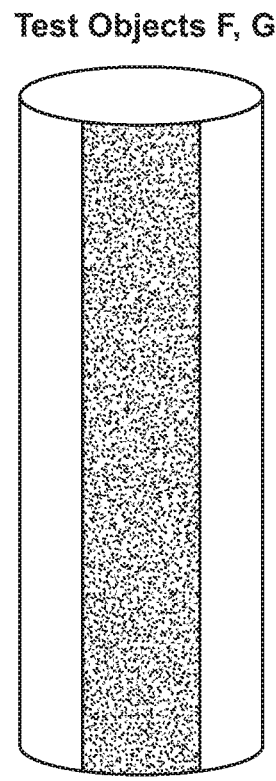
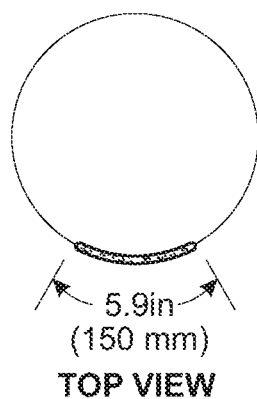
FIG. 2A  
FIG. 2B  
FIG. 2C  
FIG. 2D

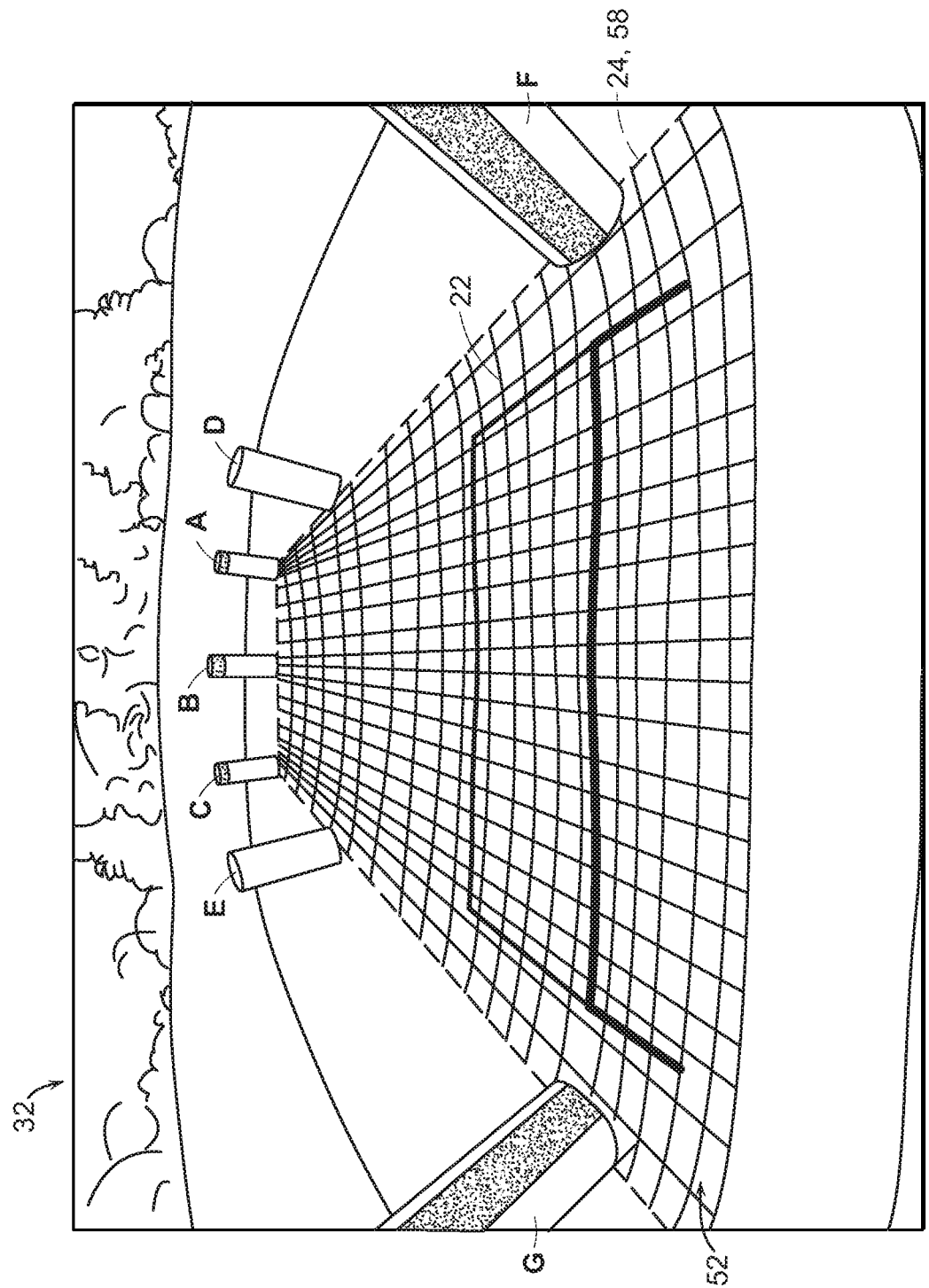

METHOD AND SYSTEM FOR DETERMINING A DEGREE OF CORRELATION BETWEEN A SIMULATED CAMERA IMAGE AND AN ACTUAL CAMERA IMAGE

CROSS REFERENCE TO RELATED APPLICATIONS

This application claims the benefit of U.S. Provisional Patent Application No. 62/615,141, filed on Jan. 9, 2018 and entitled "A METHOD AND SYSTEM FOR DETERMINING A DEGREE OF CORRELATION BETWEEN A SIMULATED CAMERA IMAGE AND AN ACTUAL CAMERA IMAGE," the entire contents of which are incorporated herein by reference.

BACKGROUND

Vehicle manufacturers often use the same model rear view camera in many different vehicles models, and variations in different vehicles may result in the rear view camera being mounted relatively high and/or at one angle in one vehicle model and being mounted relatively low and/or at another angle in another vehicle model. In order to ensure that the rear view camera installed in a vehicle provides the desired rear view and is compliant with relevant vehicle safety regulations, Field of View (FOV) simulations may be performed during the design stage of the vehicle model. A FOV simulation provides a simulated camera image of the field of view, allows for quick feedback and may be used in an iterative process to fine tune the camera position and/or orientation so as to meet all manufacturer requirements and government regulations.

Once the vehicle has been manufactured and a rear view camera has been installed, the installed camera is used to obtain a second image or actual camera image corresponding to the actual camera rear view. The actual camera image is typically visually compared to the simulated camera image to identify where there are differences in the simulated camera and actual camera images, as well as to determine what the differences are. Such information informs the design process.

It is expected and normal to see deviation in the actual camera image with respect to the simulated camera image. Such deviations may result, for example, from variations between vehicles, from installation effects and/or manufacturing differences between cameras. However, it is difficult to quantify the location and extent of the deviations between the simulated camera image and the actual camera image when the comparison is made by visual inspection and/or manual measurement, whereby variations in measured locations can be plus or minus several millimeters. Since the number of vehicles including rear view cameras is expected to increase, the number of FOV simulations is also expected to increase. Thus it is desirable to be able to reproducibly and accurately quantify where there are differences in the simulated and actual camera images, as well as what the differences are. Moreover, it is desirable to have a metric to measure the correlation between the measurements obtained from the simulated camera image and the measurements obtained from the actual camera image. Such information will result in better image comparisons and improved vehicle design processes.

SUMMARY

In some aspects, a method of determining a correlation between a simulated camera image and an actual camera image includes obtaining, from a camera field of view simulator, a simulated camera image of a scene. The scene includes a view area that is bounded by a view area peripheral edge, and a reference pattern that is overlaid on the view area and that segregates the view area into at least one region. Each region is further segregated into sections that together define a uniform orthogonal grid. The method includes obtaining, from a camera, an actual camera image of the scene. The method also includes analyzing the simulated camera image and the actual camera image to determine differences in image intensity between regions of the simulated camera image and the corresponding regions of the actual camera image, and determining a degree of correlation between the simulated camera image and the actual camera image based on the differences in image intensity.

In some embodiments, the step of determining a degree of correlation includes defining, for each region, a difference threshold, comparing, for each region, the difference in image intensity to the difference threshold, and assigning, for each region a degree of correlation based on the results of the comparison.

In some embodiments, the step of determining a degree of correlation includes providing a map that includes several difference ranges and associates each difference range with a unique correlation value. In addition, the step of determining a degree of correlation includes determining, for a given region, a correlation by identifying difference range corresponding to the difference in image intensity of the given region, and assigning to the given region the correlation value associated with the difference range.

In some embodiments, the threshold ranges are used to determine a degree of the correlation.

In some embodiments, the step of analyzing the images comprises performing a root mean square (RMS) analysis of the differences in image intensity between regions of the simulated camera image and the corresponding regions of the actual camera image. The RMS analysis provides an RMS difference that is a measure of a magnitude of the difference between the simulated camera image and the actual camera image.

In some embodiments, the RMS analysis includes the following method steps: Calculating a difference in image intensity between the sections of the simulated camera image and the corresponding sections of the actual camera image; for each section, squaring the difference to provide a squared difference; for each region, obtaining the sum over all the sections of the squared differences; for each region, dividing the sum by the number of regions to provide an average; and for each region, calculating a square root of the average to provide the RMS difference.

In some embodiments, the step of analyzing the images comprises calculating a structural similarity Index Metric (SSIM) based on the differences in image intensity between regions of the simulated camera image and the corresponding regions of the actual camera image. The SSIM provides a metric that is a measure of the similarity between the simulated camera image and the actual camera image.

In some embodiments, the reference pattern comprises a single region having shape and size that corresponds to the shape and size of the view area.

In some embodiments, the view area has a rectangular shape and a predefined size, and the reference pattern has a shape and size that corresponds to the shape and size of the view area. The reference pattern includes a corner region disposed in each corner of the reference pattern, and a central region that is disposed in a center of the reference pattern and is spaced apart from a peripheral edge of the reference pattern.

In some embodiments, each section has a rectangular shape and includes several pixels.

In some embodiments, each section consists of a single pixel.

In some embodiments, the scene includes pillars disposed in the view area, and the step of analyzing the images to determine differences in image intensity between regions of the simulated camera image and the corresponding regions of the actual camera image comprises identifying regions that include a pillar, and performing the analysis based on the identified regions.

In some aspects, a system for determining a correlation between a simulated camera image and an actual camera image includes a rear view camera installed in a vehicle configured to provide the actual camera image including a view of the rear of the vehicle, and a field of view simulation device configured to provide the simulated camera image of a simulated view of the rear of the vehicle. The system also includes a processor configured to receive as inputs the simulated camera image and the actual camera image, analyze the simulated camera image and the actual camera image to determine differences in image intensity between regions of the simulated camera image and the corresponding regions of the actual camera image; and determine a degree of correlation between the simulated camera image and the actual camera image based on the differences in image intensity.

In some aspects, the actual camera image is compared to the simulated camera image in an automated process that identifies differences in the simulated and actual camera images 32, 42, quantifies the differences, and then determines the correlation between the actual camera image 42 and the simulated camera image 32 based on the differences between the images. Advantageously, the results of the comparison are objective, repeatable and reliable, and thus are an improvement over a commonly used prior art method in which comparisons between the actual and simulated camera images are made by visual inspection.

In some aspects, the degree of correlation between the simulated camera image and the actual camera image can be established by including a known fixed pattern, e.g., a reference pattern, in the rear view scene that is imaged in both the FOV simulation and by the actual rear view camera, and then using the reference pattern to identify differences between the two images. More particularly, the degree of correlation between the simulated camera image and the actual camera image can be established using the following steps: 1) Dividing the visible image area into discrete, defined regions in each of the simulated camera image and the actual camera image; 2) For each region, defining a maximum allowable difference threshold; 3) analyzing the images to determine differences between regions of the simulated camera image and the corresponding regions of the actual camera image; and 4) for each region, comparing the differences to the threshold in order to assign a degree of correlation. The threshold is defined based on the requirements of the specific application, and may be used to classify the correlation, for example, as good, acceptable or bad.

BRIEF DESCRIPTION OF THE FIGURES

FIG. 2A is a front view of pillars A, B and C illustrating a position and dimensions of a portion (shown in black) of the pillar that is required to appear in the rear view image.

FIG. 2B is a front view of the pillars D and E.

FIG. 2C is a front view of the pillars F and G illustrating a position and dimensions of a portion (shown in black) of the pillar that is required to appear in the rear view image.

FIG. 2D is a top view of the pillars F and G illustrating an arc length of the portion shown in FIG. 2C.

FIG. 4 is an illustration of a simulated camera image with the reference pattern omitted.

DETAILED DESCRIPTION

Figure 1:
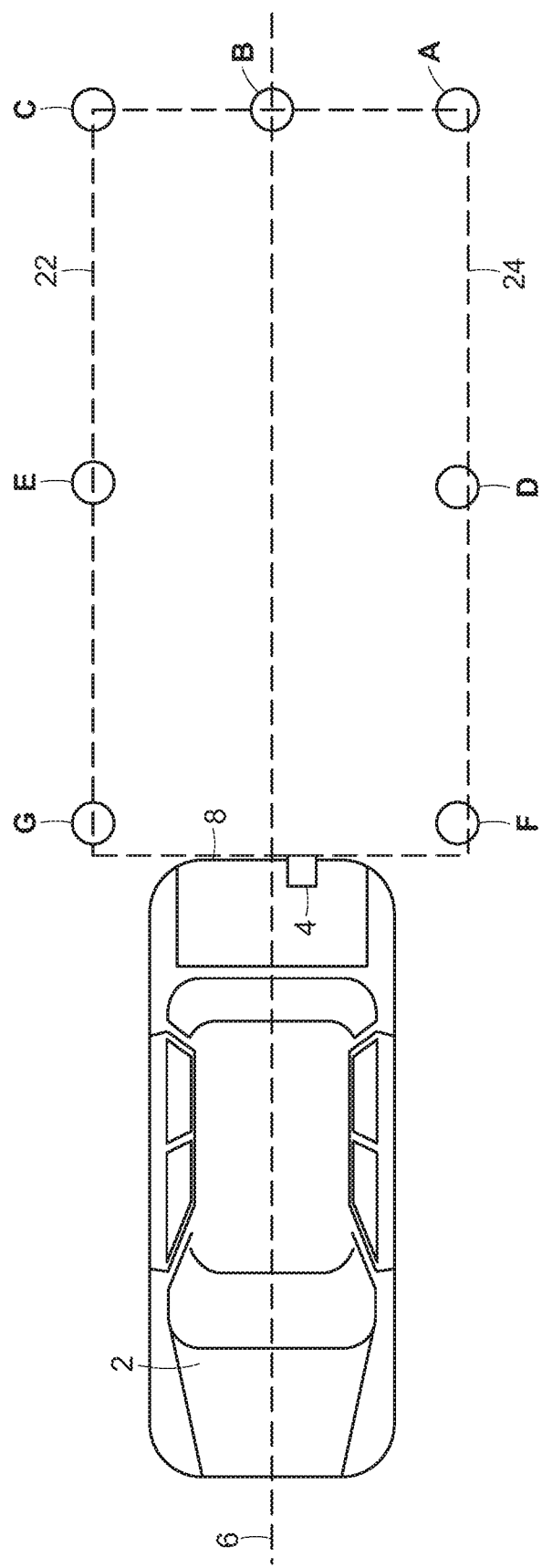
FIG. 1 is an illustration of a vehicle including a rear view camera and of a view area of the camera positioned rearward of the vehicle.

A method and system 1 is provided for determining a degree of correlation between a simulated camera image 32 and an actual camera image 42. The method is performed by the system 1, which inputs the simulated camera image 32 and the actual camera image 42 and uses automated image processing to identify differences between the simulated and actual camera images 32, 42, and determine the correlation between the actual camera image 42 and the simulated camera image 32 based on the identified differences. In some embodiments, the outcome of the comparison including the correlation information is used to validate the FOV simulation. In other embodiments, the outcome of the comparison including the correlation information is used to revise and/or correct the FOV simulation so as to provide an improved FOV simulation for used during vehicle 2 and/or camera 4 design. The method will be described in detail below.

Referring to FIGS. 1 and 2A-2D, in the illustrated embodiment, the camera 4 is a rear view camera that is mounted on a vehicle 2 in such a way as to provide a rear view of the vehicle to an operator of the vehicle via a vehicle display (not shown) provided in the vehicle 2 at a location easily viewed by the driver during vehicle operation. The camera 4 may be, for example, a wide angle rear view camera 4.

In order to comply with transportation regulations, most new passenger vehicles sold in the United States will be required to include a rear view system that provides to the vehicle operator a visual image, detected by means of a single source (for example, the rear view camera 4), of the area directly behind a vehicle 2. In particular, federal motor vehicle safety standards (e.g., FMVSS 111) require that the rear view system enables a driver of the vehicle to view a rectangular rear view area 22 that encompasses five feet to each lateral side from the longitudinal centerline 6 of the vehicle and extends twenty feet rearward of the vehicle's rear bumper 8. The regulation also defines the required field of view of the camera through the placement of seven test objects (e.g., pillars) within the rear view area 22. The pillars, labeled as A, B, C, D, E and F, are right cylinders that are 0.8 meters in height and 0.3 meters in diameter. The pillars are placed in predetermined positions along the perimeter of the rear view area 22 as shown in FIG. 1.

In particular, when tested, the image obtained by the vehicle rear view camera 4 is required to include: (a) A minimum of a 150-mm wide portion along the circumference of each pillar F and G; and (b) The full width and height of each pillar A through E. In addition, when the rear view image is measured, the calculated visual angle subtended by the horizontal width of (a) All three pillars A, B, and C is required to average not less than 5 minutes of arc; and (b) Each individual pillar A, B, and C is required to not be less than 3 minutes of arc.

Rear view camera FOV simulations are performed during the design stage of the vehicle model to optimize placement and orientation of the rear view camera 4 with in the vehicle 2 and to ensure that the view corresponding to the placement and orientation will meet regulations. The rear view camera FOV simulations provide a simulated camera image 32 that includes the view area 22 and the pillars A, B, C, D, E, F placed within the view area 22 as specified.

Figure 3:
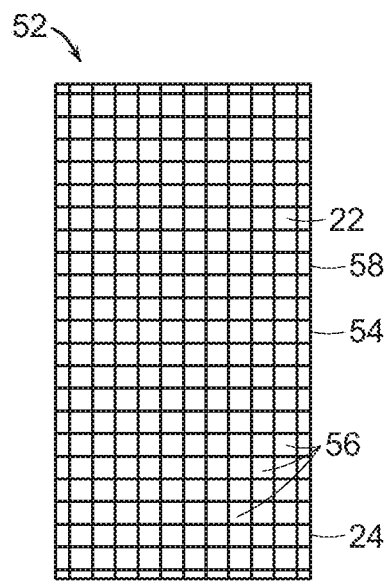
FIG. 3 is an illustration of a reference pattern used in the simulated camera image and the actual camera image.

Referring to FIGS. 3 and 4, in addition to the view area 22 and the pillars A, B, C, D, E, F, the simulated camera image 32 also includes a defined reference pattern 52 (FIG. 3) that is overlaid (e.g., superimposed) upon the view area 22. The reference pattern 52 segregates the view area 22 into at least one region 54, and each region 54 is further segregated into sections 56 that together define a uniform orthogonal grid. In particular, the sections 56 are defined by a network of lines that cross each other to delineate a series of square areas of known, uniform size and that are arranged in aligned rows and columns. In this embodiment, the reference pattern 52 includes a single region 54 that encompasses the entire view area 22, and the region 52 is further segregated into several square sections 56.

The reference pattern 52 is sized and shaped to extend over an area that corresponds to the rear view area 22 such that the peripheral edge 58 of the reference pattern 52 coincides with the peripheral edge 24 of the view area 22. That is, the reference pattern 52 is rectangular in shaped and is sized to extend over a simulated area that is twenty feet long in a direction parallel to the vehicle longitudinal centerline 6 and extends five feet to each lateral side from the longitudinal centerline 6 of the vehicle 2. The rear view area 22, pillars A, B, C, D, E, F, and the reference pattern 52 constitute a scene 8 that is depicted in the simulated camera image 32 (FIG. 4).

The simulated camera image 32 is generated using an algorithm that provides the image based on a calculated three dimensional camera position relative to the rear view scene 8, including position and angle relative to an origin. In some embodiments, the origin is centered on the left rear tire, but is not limited to this location. The algorithm also generates the image based on camera properties such as focal length, distortion characteristics, etc.

In some embodiments, the simulated camera image 32 is processed in the same manner as the corresponding actual vehicle rear view camera image 42 is processed by the vehicle rear view system. For example, for cases in which the rear view camera being simulated is a wide-angle camera, the simulated camera image 32 may be subjected to distortion correction, for example by using the same algorithm that is used by the vehicle camera system to correct the actual camera image. In some embodiments, image processing such as distortion correction is performed automatically by the FOV simulation device 30. In other embodiments, image processing such as distortion correction may be performed following generation of the simulated camera image, for example in a downstream process.

Figure 5:
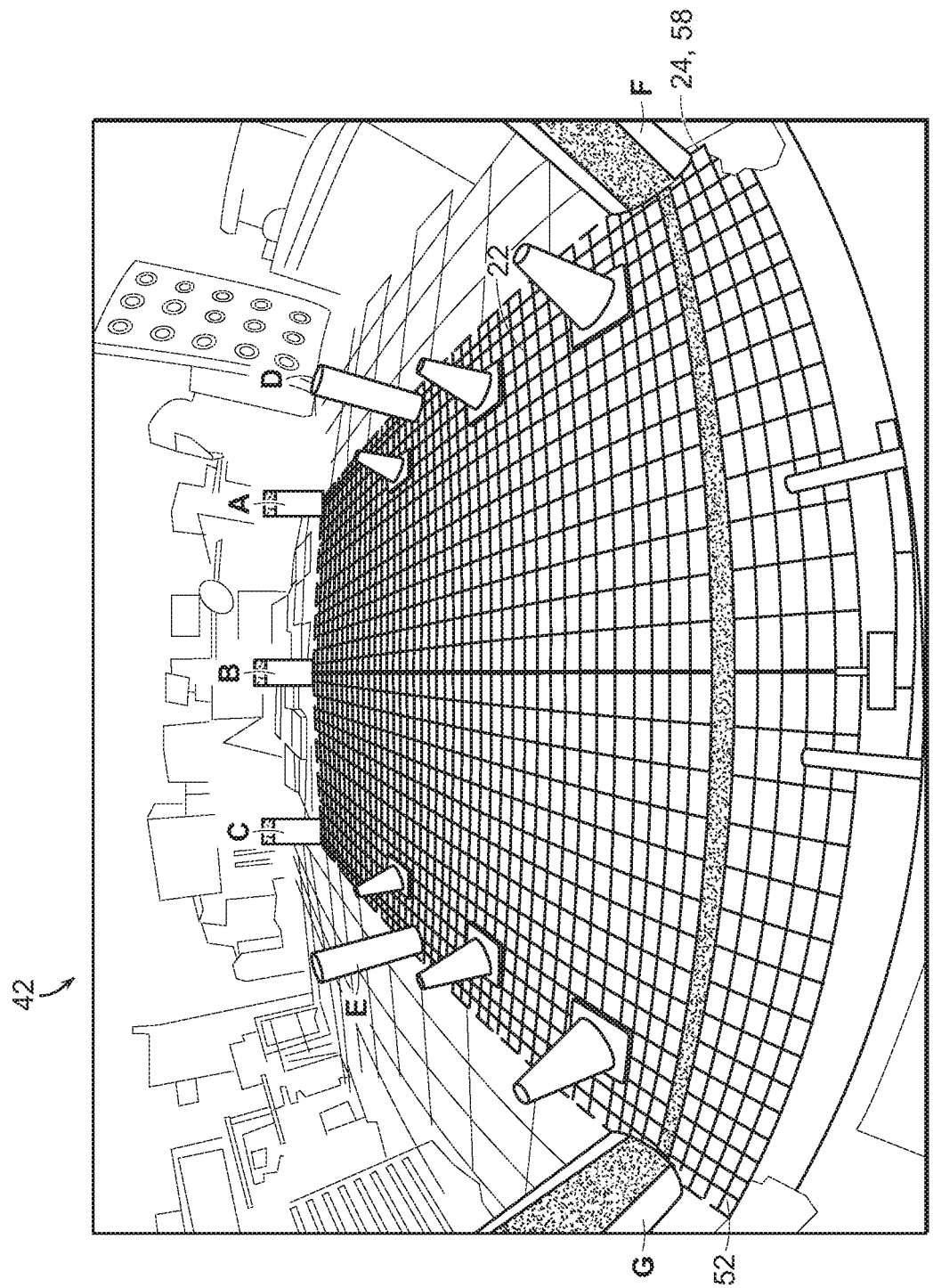
FIG. 5 is an illustration of an actual camera image.

Referring to FIG. 5, when the vehicle has been manufactured, a second image 42 is obtained that corresponds to the actual rear view as produced by the rear view camera 4 installed in the vehicle 2. Like the simulated camera image 32, the actual camera image 42 provides an image of the scene 8. That is, the actual camera image 42 includes the rear view area 22 and the pillars A, B, C, D, E, F placed within view area 22 as required, as well as the defined reference pattern 52 that is overlaid upon the view area 22. For example, in some embodiments, the vehicle 2 is positioned adjacent to a rear view scene as shown in FIG. 1. In the rear view scene, pillars A, B, C, D, E, F are set behind the vehicle at the predetermined locations specified in FVSSS 111 within the twenty foot by ten foot area A. In addition, the reference pattern 52 is applied to the floor within the view area 22, so that the actual camera image 42 of the view area 22 obtained from the rear view camera 4 includes the pillars A, B, C, D, E, F and the reference pattern 52.

The actual camera image 42 obtained corresponds to the image as would be displayed by the vehicle on the display unit viewed by the driver during vehicle operation. In some embodiments, the actual camera image 42 has been subjected to image processing prior to being displayed. For example, in some cases in which the rear view camera 4 is a wide-angle camera, the actual camera image 42 may have been subjected to distortion correction.

Figure 6:
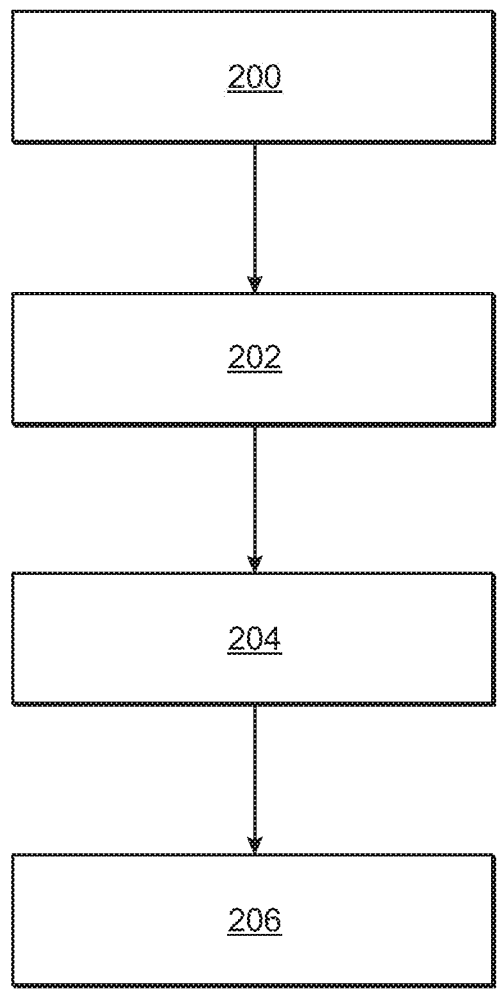
FIG. 6 is a flow chart illustrating the method of determining a degree of correlation between a simulated camera image and an actual camera image.
Figure 7:
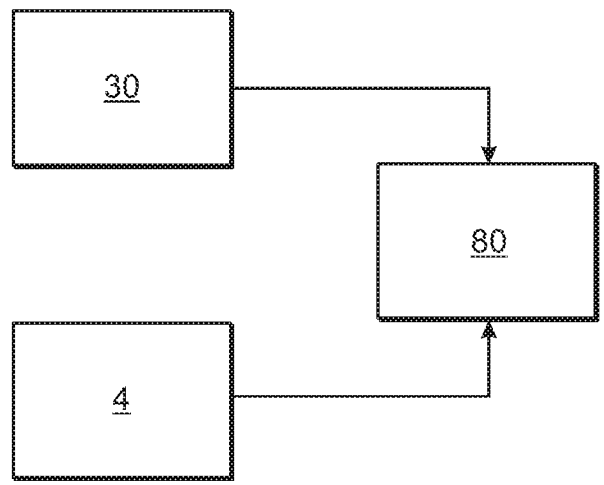
FIG. 7 is a schematic diagram of a system used to perform the method of determining a degree of correlation between a simulated camera image and an actual camera image.

Referring to FIGS. 6 and 7, the method of determining a correlation between the simulated camera image 32 and the actual camera image 42 includes the following steps:

Initially, a simulated camera image of the scene 8 is obtained from the camera field of view simulator (step 200). As discussed above, the scene 8 includes the view area 22, which in this example is a rectangular area that is bounded by a view area peripheral edge 24. The scene 8 includes the includes the pillars A, B, C, D, E, F, and includes the reference pattern 52 that is overlaid on the view area 22 and that segregates the view area into at least one region 54, each region 54 being further segregated into sections 56 that together define a uniform orthogonal grid. In some embodiments, this step may occur during the design phase of the vehicle 2, but is not limited to being performed at this time. An example simulated camera image is shown in FIG. 4.

In addition to obtaining a simulated camera image 32, the method includes obtaining, from the camera 4, an actual camera image 42 of the scene 8 (step 202). The actual camera image 42 includes the scene 8 having the same elements as were imaged by the camera field of view simulator. Like the simulated camera image 32, the actual camera image 42 includes the view area 22 which is a rectangular area that is bounded by a view area peripheral edge 24. The actual camera image 42 includes the pillars A, B, C, D, E, F, and includes the reference pattern 52 that is overlaid on the view area 22. This step occurs following manufacture of the vehicle. An example actual camera image is shown in FIG. 4.

Once both the simulated camera image 32 and the actual camera image 42 have been obtained, the images 32, 42 are analyzed to determine differences between regions of the simulated camera image 32 and the corresponding regions 42 of the actual camera image 42 (step 204). For example, in some embodiments, for each region 56, the image intensity of the simulated camera image 32 is compared to the image intensity of the actual camera image 42 by performing a root mean square (RMS) analysis of the differences in image intensity between sections 56 of the simulated camera image and the corresponding sections 56 of the actual camera image. The RMS analysis provides an RMS difference that is a measure of a magnitude of the difference between the simulated camera image and the actual camera image.

More specifically, the RMS analysis includes calculating a difference in image intensity between each section 56 of the simulated camera image 32 and the corresponding section 56 of the actual camera image 42. For each section 56, the difference is squared to provide a squared difference. For each region 54, the sum over all the sections of the squared differences is calculated and then the sum is divided by the number of regions to provide an average. For each region 54, a square root of the average is calculated to provide the RMS difference.

Following the analysis to determine differences, the degree of correlation between the simulated camera image 32 and the actual camera image 42 is determined based on the differences between the images (step 206). The degree of correlation is determined by defining, for each region, a difference threshold, and comparing, for each region, the difference in image intensity to the difference threshold. In addition, a degree of correlation is assigned to each region based on the results of the comparison. For example, in some embodiments, if the RMS difference of a region 54(i) is less than the difference threshold for that region 54(i), the region 54(i) may be assigned a degree of correlation referred to as "acceptable," whereas if the RMS difference of the region 54(i) is greater than the difference threshold for that region 54(i), the region 54(i) may be assigned a degree of correlation referred to as "unacceptable."

In another example, the degree of correlation is determined by defining, for each region, a map that includes several difference ranges, and associates each difference range with a unique correlation value. A degree of correlation is assigned to each region 54 by identifying a difference range corresponding to the calculated RMS difference of the region 54, and assigning to the region 54 the correlation value associated with the difference range.

In some embodiments, the comparison and correlation determination is performed by a processor 80 (FIG. 7) that stores, and is configured to execute, a set of computer executable digital instructions for performing the comparison and correlation determination. The processor 80 may be embodied as a mobile processing device, a smartphone, a tablet computer, a laptop computer, a wearable computing device, a desktop computer, a personal digital assistant (PDA) device, a handheld processor device, a specialized processor device, a system of processors distributed across a network, a system of processors configured in wired or wireless communication, or any other alternative embodiment known to one of ordinary skill in the art. The set of computer-executable instructions may include instructions and data which cause a general purpose computer, special purpose computer, or special purpose processing device to perform a certain function or group of functions. Computer-executable instructions may also include program modules that are executed by computers in stand-alone or network environments. Program modules may include routines, programs, objects, components, or data structures that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Figure 8:
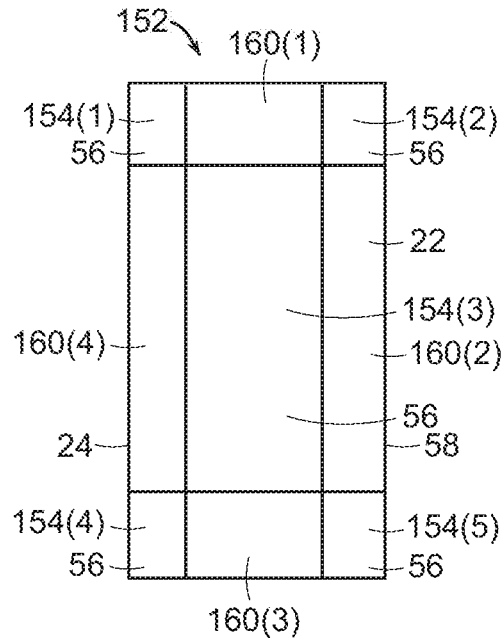
FIG. 8 is an alternative embodiment reference pattern used in the simulated camera image and the actual camera image.

In the embodiment illustrated in FIG. 3, the reference pattern 52 includes a single region 54 having shape and size that corresponds to the shape and size of the view area 22, where the single region 54 is segregated in to several sections 56. However, referring to FIG. 8, it is contemplated that an alternative reference pattern 152 may be used in which the view area 22 is divided into several discrete, defined rectangular regions 154(1), 154(2), . . . , 154(n), where n refers to the number of regions 154. In this embodiment, there are five regions 154(1), 154(2), 154(3), 154(4), 154(5), of non-uniform size, including a central region 154(3) and four corner regions 154(1), 154(2), 154(4), 154(5). The corner regions 154(1), 154(2), 154(4), 154(5) are disposed between the central region 154(3) and the peripheral edge 24 of the view area 22 so that the corner regions 154(1), 154(2), 154(4), 154(5) coincide with the corners of the view area 22. In addition, each region 154(1), 154(2), . . . 154(5) has a single section 56 of the same size and shape as the region 154, and each section 56 includes several pixels. The number of pixels disposed in each section 56 depends on the size of the grid and on image resolution.

In some embodiments, the image resolution of the view area 22 corresponding to the required twenty foot by ten foot view area 22 is 640 pixels by 480 pixels. In addition, the central region 154(3) is sized to correspond to 384 pixels by 288 pixels, is centered within the view area 22, is spaced apart from the peripheral edge 24 of the view area 22 and is oriented so as to be elongated in a direction parallel to the longitudinal centerline 6 of the vehicle 2. In addition, the corner regions 154(1), 154(2), 154(4), 154(5), are chosen to have a size that is 20 percent of the total image resolution. For example, the corner regions 154(1), 154(2), 154(4), 154(5), have a size of 128 pixels by 96 pixels, and are oriented so as to be elongated in a direction parallel to the longitudinal centerline 6 of the vehicle.

The corner regions 154(1), 154(2), 154(4), 154(5), correspond to locations within the view area 22 specified under the standards as including a pillar (for example, pillars A, C, F and G). In addition, due to the nature of the rear view camera wide angle lens, the corner regions 154(1), 154(2), 154(4), 154(5) have relatively higher distortion than the central region 154(3), and thus it would be advantageous to carefully analyze corner regions 154(1), 154(2), 154(4), 154(5), for example to minimize errors in the corner regions 154(1), 154(2), 154(4), 154(5).

In some embodiments, portions 160(1), 160(2), 160(3), 160(4) of the reference pattern 152 between the corner regions 154(1), 154(2), 154(4), 154(5) and the central region 154(3) may also be included in the analysis and correlation determination steps. In other embodiments, for example those in which the portions 160(1), 160(2), 160(3), 160(4) are considered to be areas of relatively low interest, the portions 160(1), 160(2), 160(3), 160(4) are not analyzed.

Figure 9:
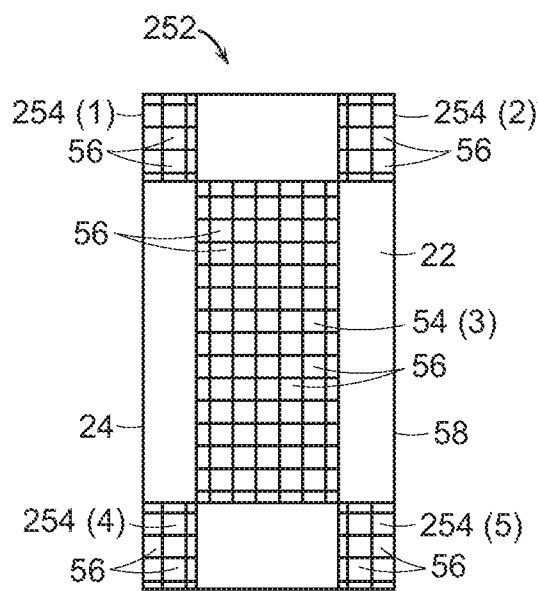
FIG. 9 is an alternative embodiment reference pattern used in the simulated camera image and the actual camera image.

Referring to FIG. 9, another alternative reference pattern 252 may be used in which the view area 22 is divided into five discrete, defined rectangular regions 254(1), 254(2), 254(3), 254(4), 254(5) of non-uniform size, including a central region 254(3) and four corner regions 254(1), 254(2), 254(4), 254(5). The corner regions 254(1), 254(2), 254(4), 254(5) are disposed between the central region 254(3) and the peripheral edge 24 of the view area 22 so that the corner regions 254(1), 254(2), 254(4), 254(5) coincide with the corners of the view area 22. In addition, each region 254(1), 254(2), 254(3), 254(4), 254(5) is segregated into several sections 56 that together define a uniform orthogonal grid, and each section 56 is configured to include a single pixel.

Figure 10:
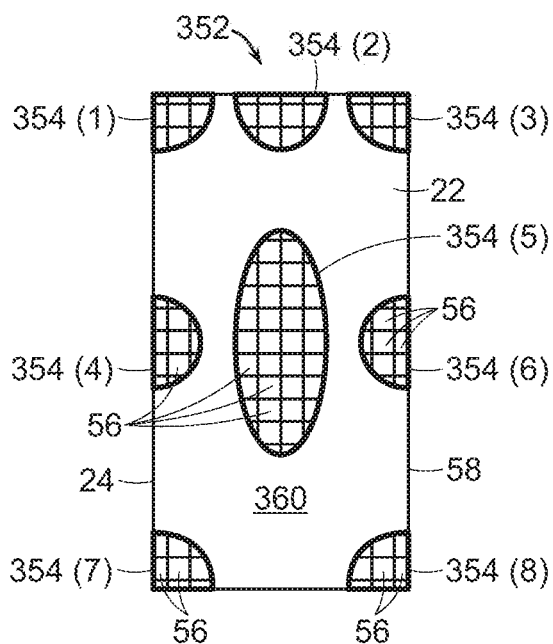
FIG. 10 is an alternative embodiment reference pattern used in the simulated camera image and the actual camera image.

Referring to FIG. 10, another alternative reference pattern 352 may be used in which the view area 22 is divided into eight discrete, defined arcuate regions 354(1), 354(2), 354(3), 354(4), 354(5), 354(6), 354(7), 354(8) of non-uniform size, including an oval central region 354(3), four corner regions 354(1), 354(3), 354(7), 354(8) having a quadrant shape, and three mid-side regions 354(2), 354(4), 354(6) having a semi-circular shape. The corner regions 354(1), 354(3), 354(7), 354(8) are disposed between the central region 354(5) and the peripheral edge 24 of the view area 22 so that the corner regions 354(1), 354(3), 354(7), 354(8) coincide with the corners of the view area 22. The mid-side regions 354(2), 354(4), 354(6) are disposed along the peripheral edge midway between the corner regions 354(1), 354(3), 354(7), 354(8). The corner regions 354(1), 354(3), 354(7), 354(8) and the mid-side regions 354(2), 354(4), 354(6) each correspond to the location of a pillar A, B, C, D, E, F, G, and thus are regions of particular interest. As in the embodiment illustrated in FIG. 9, each region 354(1), 354(2), 354(3), 354(4), 354(5), 354(6), 354(7), 354(8) is segregated into several sections 56 that together define a uniform orthogonal grid, and each section 56 configured to include a single pixel.

Although the method step of analyzing the simulated and actual camera images 32, 42 to determine differences between regions 54 of the simulated camera image 32 and the corresponding regions 54 of the actual camera image 42 described above compares image intensity, the method is not limited to using the property of image intensity for the comparison. For example, in some embodiments, algorithms are used to detect the number of edges and/or corners within each section, and then number of edges and/or corners in corresponding sections of the simulated and actual camera images 32, 42 is compared to identify differences between these images. In another example, the simulated and actual camera images 32, 42 are each analyzed by identifying portions of the respective images that include a pillar A, B, C, D, E, F, G, and performing an image intensity comparison based on the identified portions rather than the regions and/or sections within the regions.

In the illustrated embodiment, the simulated camera image 32 and the actual camera image 42 each include a representation of the scene 8, which in turn includes the view area 22, the pillars A, B, C, D, E, F and the reference pattern 52. However, in some embodiments, inclusion of the pillars A, B, C, D, E, F may be omitted from the scene 8 when performing the method.

Although a root mean square analysis is used here to provide a measure of the magnitude of the difference between the two images, other analyses can be substituted for the RMS analysis. For example, in some embodiments, other analyses may be used to measure the similarity between the two images such as, but not limited to, structural similarity index metric (SSIM), peak signal-to-noise ratio (PSNR) and mean squared error (MSE). In the case of the SSIM, the step of analyzing the images includes calculating an SSIM based on the differences in image intensity between sections or regions of the simulated camera image 32 and the corresponding sections or regions of the actual camera image 42. The S SIM provides a metric that is a measure of the similarity between the simulated camera image 32 and the actual camera image 42.

Although the device and method described herein includes several examples of reference patterns 52, 152, 252, 352 that can be included in the images and used to perform the correlation analysis, it is understood that the reference patterns described herein are exemplary and non-limiting, and that other reference patterns can be used as an alternative to the above-described reference patterns, or in combination with the above-described reference patterns, to perform the correlation analysis.

Although the device and method described herein includes comparison methods such as a root mean square analysis and a structural similarity index metric analysis to determine the differences, and provide a degree of correlation, between the simulated camera image and the actual camera image, the device and method are not limited to these comparison methods. It is understood that other appropriate comparison methods and techniques can be used as an alternative to the above-described comparison methods, or in combination with the above-described comparison methods, to determine the differences, and provide a degree of correlation, between the simulated camera image and the actual camera image.

Although the image comparison device and method are described herein with respect to a rear view camera of a vehicle, it is understood that the image comparison device and method could be applied to other vehicle cameras including front view cameras and interior view cameras. Moreover, although the image comparison device and method are described herein with respect to a vehicle camera, it is understood that the image comparison device and method could be applied to other camera applications, including surveillance, medical diagnostics, etc.

I claim:

1. A method of determining a correlation between a simulated camera image and an actual camera image, the method including the following steps:

obtaining, from a camera field of view simulator, a simulated camera image of a scene, the scene including a view area that is bounded by a view area peripheral edge, the scene including a reference pattern that is overlaid on the view area and that segregates the view area into at least one region, each region being further segregated into sections that together define a uniform orthogonal grid;

obtaining, from a camera, an actual camera image of the scene;

analyzing the simulated camera image and the actual camera image to determine differences in image intensity between regions of the simulated camera image and the corresponding regions of the actual camera image; and determining a degree of correlation between the simulated camera image and the actual camera image based on the differences in image intensity.

2. The method of claim 1, wherein the step of determining a degree of correlation includes defining, for each region, a difference threshold;

comparing, for each region, the difference in image intensity to the difference threshold; and assigning, for each region a degree of correlation based on the results of the comparison.

3. The method of claim 2, wherein the step of determining a degree of correlation includes providing a map that includes several difference ranges and associates each difference range with a unique correlation value, and determining, for a given region, a correlation by identifying difference range corresponding to the difference in image intensity of the given region, and assigning to the given region the correlation value associated with the difference range.

4. The method of claim 3, wherein the threshold ranges are used to determine a degree of the correlation.

5. The method of claim 1, wherein the step of analyzing the images comprises performing a root mean square (RMS) analysis of the differences in image intensity between regions of the simulated camera image and the corresponding regions of the actual camera image, the RMS analysis providing an RMS difference that is a measure of a magnitude of the difference between the simulated camera image and the actual camera image.

6. The method of claim 5, wherein the RMS analysis comprises,
   calculating a difference in image intensity between the sections of the simulated camera image and the corresponding sections of the actual camera image;
   for each section, squaring the difference to provide a squared difference;
   for each region, obtaining the sum over all the sections of the squared differences;
   for each region, dividing the sum by the number of regions to provide an average; and
   for each region, calculating a square root of the average to provide the RMS difference.

7. The method of claim 1, wherein the step of analyzing the images comprises calculating a structural similarity Index Metric (SSIM) based on the differences in image intensity between regions of the simulated camera image and the corresponding regions of the actual camera image, the SSIM providing a metric that is a measure of the similarity between the simulated camera image and the actual camera image.

8. The method of claim 1, wherein the reference pattern comprises a single region having shape and size that corresponds to the shape and size of the view area.

9. The method of claim 1, wherein the view area has a rectangular shape and a predefined size, and the reference pattern has a shape and size that corresponds to the shape and size of the view area, the reference pattern including a corner region disposed in each corner of the reference pattern, and a central region that is disposed in a center of the reference pattern and is spaced apart from a peripheral edge of the reference pattern.

10. The method of claim 1, wherein each section has a rectangular shape and includes several pixels.

11. The method of claim 1, wherein each section consists of a single pixel.

12. The method of claim 1, wherein
   the scene includes pillars disposed in the view area, and
   the step of analyzing the images to determine differences in image intensity between regions of the simulated camera image and the corresponding regions of the actual camera image comprises identifying regions that include a pillar, and performing the analysis based on the identified regions.

* * * * *